United States Patent
Ingram et al.

(10) Patent No.: US 7,111,897 B2
(45) Date of Patent: Sep. 26, 2006

(54) TRAVEL TRAILER

(75) Inventors: Anthony G. Ingram, Casper, WY (US); Marion B. Johnson, Casper, WY (US); Terry L. Harkins, Casper, WY (US)

(73) Assignee: B & B Homes Corp., Casper, WY (US)

( * ) Notice: Subject to any disclaimer, the term of this patent is extended or adjusted under 35 U.S.C. 154(b) by 15 days.

(21) Appl. No.: 11/069,419

(22) Filed: Feb. 28, 2005

(65) Prior Publication Data

US 2006/0012219 A1    Jan. 19, 2006

Related U.S. Application Data

(60) Division of application No. 10/336,232, filed on Jan. 3, 2003, now Pat. No. 6,860,545, which is a continuation of application No. 09/753,406, filed on Jan. 3, 2001, now Pat. No. 6,502,894, which is a continuation-in-part of application No. 09/630,204, filed on Aug. 1, 2000, now Pat. No. 6,343,830.

(51) Int. Cl.
*B60P 3/335* (2006.01)

(52) U.S. Cl. ................................ 296/168; 296/171

(58) Field of Classification Search ............ 296/168, 296/184.1, 164, 181
See application file for complete search history.

(56) References Cited

U.S. PATENT DOCUMENTS

| | | | |
|---|---|---|---|
| 1,475,332 A | 1/1923 | Wales | |
| 3,165,350 A | 1/1965 | Willson | |
| 3,254,914 A | 6/1966 | Steck | |
| 3,287,058 A | 11/1966 | Wells | |
| 3,565,480 A | 2/1971 | McCollum et al. | |
| 3,580,599 A | 5/1971 | Dodgen et al. | |
| 3,770,297 A | 11/1973 | Quick | |

(Continued)

OTHER PUBLICATIONS

Teton Homes Sales Brochure, Titled "1994 Fifth Wheels, 102 Inch Wide Body," pp. 6-7 and front and back covers, dated: Dec. 1, 1993.

*Primary Examiner*—Kiran B. Patel
(74) *Attorney, Agent, or Firm*—ipsolon llp

(57) ABSTRACT

A travel trailer having a two-level chassis supporting at least two discrete floor sections at at least two different heights above the ground with at least one of those floors having a bathroom portion being supported by an upper chassis beam is disclosed. In a preferred embodiment, the chassis has a substantially horizontal forward upper portion and a substantially horizontal rearward lower portion, and an upper floor is secured to the upper portion and a lower floor is secured to the lower portion with an intermediate floor positioned below the upper edge of the upper portion of the chassis to a height intermediate that of the upper and lower floors. In an alternative preferred embodiment, the intermediate floor is suspended below the upper chassis portion. The area underneath the intermediate section and above the bottom of the trailer defines a storage area that is not blocked or limited in size by the width of the chassis beams. In a more preferred embodiment, common fixed trailer accessories, such as gray and black water tanks, their related plumbing, trailer heaters and the like are clustered together within and near a limited section of the storage area, such as near the rear of the storage area, such that the majority of the storage area remains unoccupied. Accordingly, storage space within the storage area is optimized, and the full height of the storage area is available throughout the majority of the storage area to accommodate oversized objects.

11 Claims, 6 Drawing Sheets

U.S. PATENT DOCUMENTS

| | | | |
|---|---|---|---|
| 3,790,189 A | 2/1974 | Winter | |
| 3,801,135 A | 4/1974 | Winter | |
| 3,817,545 A | 6/1974 | Ward | |
| 3,871,700 A | 3/1975 | Brownlee | |
| 4,014,586 A | 3/1977 | Swofford | |
| 4,106,732 A | 8/1978 | Whiting | |
| 4,127,299 A * | 11/1978 | Blair | 296/168 |
| 4,322,108 A | 3/1982 | McPherson | |
| D267,710 S * | 1/1983 | King | D12/103 |
| 4,500,132 A * | 2/1985 | Yoder | 296/171 |
| 4,652,041 A | 3/1987 | Barber et al. | |
| 4,653,125 A | 3/1987 | Porter | |
| 4,728,144 A * | 3/1988 | Crean | 296/168 |
| 4,746,164 A | 5/1988 | Crean | |
| 4,776,631 A | 10/1988 | Sargent et al. | |
| 4,955,661 A * | 9/1990 | Mattice | 296/174 |
| 4,957,323 A | 9/1990 | Johnson | |
| 4,974,899 A | 12/1990 | Sargent | |
| 5,180,205 A * | 1/1993 | Shoop | 296/168 |
| 5,237,782 A * | 8/1993 | Cooper | 296/171 |
| D342,700 S * | 12/1993 | Vernese | D12/102 |
| 5,501,150 A | 3/1996 | Leenders et al. | |
| 5,501,504 A | 3/1996 | Kunz | |
| 5,658,031 A * | 8/1997 | DiBiagio et al. | 296/156 |
| 5,746,473 A * | 5/1998 | Crean | 296/168 |
| 5,784,849 A | 7/1998 | DeVon et al. | |
| 5,967,583 A * | 10/1999 | Wishart | 296/164 |
| 6,170,903 B1 * | 1/2001 | Crean | 296/168 |
| 6,231,115 B1 * | 5/2001 | Crean | 296/171 |
| RE37,351 E | 9/2001 | Crean | |
| 6,302,475 B1 * | 10/2001 | Anderson | 296/175 |
| 6,343,830 B1 | 2/2002 | Ingram et al. | |
| 6,394,533 B1 * | 5/2002 | Ladell et al. | 296/165 |
| 6,502,894 B1 | 1/2003 | Ingram et al. | |
| 6,565,144 B1 | 5/2003 | Crean | |
| 6,652,003 B1 | 11/2003 | Most et al. | |
| 6,729,678 B1 * | 5/2004 | Atcravi | 296/168 |
| 2003/0067152 A1 | 4/2003 | Most et al. | |

* cited by examiner

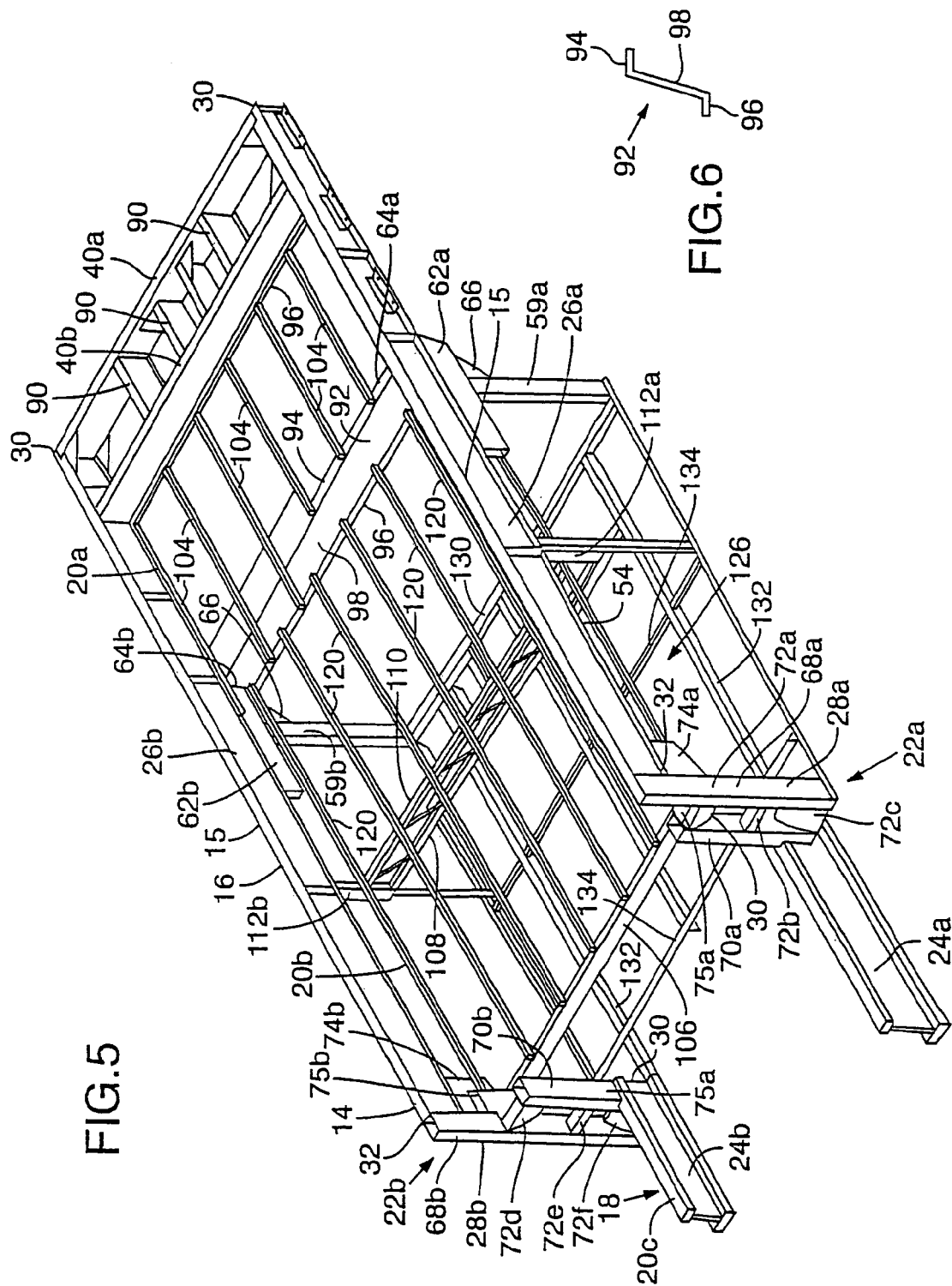

TRAVEL TRAILER

REFERENCE TO RELATED APPLICATIONS

This application is a divisional of U.S. patent application Ser. No. 10/336,232, which issued as U.S. Pat. No. 6,860,545 on Mar. 1, 2005, which is a continuation of U.S. patent application Ser. No. 09/753,406 filed on Jan. 3, 2001 and issued as U.S. Pat. No. 6,502,894 on Jan. 7, 2003, and a continuation-in-part of U.S. patent application Ser. No. 09/630,204 filed on Aug. 1, 2000 and issued as U.S. Pat. No. 6,343,830 on Feb. 5, 2002.

TECHNICAL FIELD

The invention is an improved travel trailer. In particular, the invention concerns a travel trailer having an improved chassis that is strong, and easy and economical to manufacture, and has at least one floor suspended from the chassis, which preferably optimizes use of available storage space beneath that floor.

BACKGROUND OF THE INVENTION

Travel trailers, which are towed vehicles usually having many of the conveniences of a home, are widely known and popular. One known type of travel trailer is commonly referred to as a "fifth-wheel" trailer, which is particularly adapted to be towed by a traditional pick-up truck. Namely, the forward portion of the fifth-wheel trailer is elevated above the bed of the pick-up truck and includes a mounting portion extending from the bottom of the elevated forward portion to a trailer mount, or hitch, secured to the bed of the pick-up truck.

Because of height restrictions imposed on travel trailers operating on most highways and aerodynamic considerations associated with towing a travel trailer at high speeds, the total desirable height above the ground for a fifth-wheel trailer is limited. Accordingly, the elevated forward portion typically has limited headroom, and therefore is usually used as a bedroom. The remaining aft portion of the fifth-wheel trailer typically includes a bathroom portion and general living portion.

Plumbing in trailer bathrooms typically includes gray and black water storage tanks and related tubing and valves extending from one or more toilets, shower drains, sink drains, and the like within the bathroom, to these storage tanks. To take full advantage of gravity, these types of storage tanks are typically mounted somewhere below the drains and toilet such that water from these devices flows freely through this tubing to its respective storage tanks. Accordingly, it is desirable to elevate the floor of the bathroom portion of a trailer above the bottom of the trailer.

Because of the limited headroom, it is not desirable to elevate the bathroom portion of the floor to the height of the forward bedroom floor of the trailer. Accordingly, the typical fifth-wheel trailer will usually longitudinally position the bathroom portion between the bedroom and living portion, and vertically elevate the floor of the bathroom portion to an intermediate height between the heights of the bedroom and living portion floors. The end result is a fifth-wheel trailer having three floor heights above the ground. A first height toward the aft of the trailer supporting the living portion, a second height toward the center of the trailer supporting the bathroom portion, and a third height toward the front of the trailer supporting a bedroom.

The area below the second height and the bottom of the trailer is typically enclosed and used as a storage space for the storage tanks, valves, and plumbing. In addition, this area is typically large enough to be used as a general storage area, or trunk space, for travel gear and the like. Accordingly, one or more access doors may be provided along the exterior walls of this storage area to provide access to this space. It is desirable for this storage area to be large and easily accessible.

The chassis of a typical fifth-wheel trailer must be sufficiently strong to support the trailer, and durable enough to resist weakening over a lifetime of prolonged use. Since the typical fifth-wheel trailer is regularly towed at high speeds and over rough or unimproved roads, the chassis must also withstand a tremendous amount of dynamic loads placed on it. Typical chassis materials are incredibly strong and durable. For example, a typical fifth-wheel chassis will be made of welded-together portions of elongate steel I-beam having an eight-inch to 12-inch vertical web. In general, the fewer parts and welds making up the primary load carrying chassis structure, the stronger and more durable the chassis.

A particularly strong chassis design is commonly known as a two level chassis. It's general design is shown and identified as prior art in FIG. 1A of U.S. Pat. No. 5,746,473 to Crean, the disclosure of which is hereby incorporated by reference. A two level chassis features an elongate horizontal lower beam (114, FIG. 1A of Crean), an elevated elongate horizontal upper beam (116, FIG. 1A of Crean), and an interconnecting vertical section (115, FIG. 1A of Crean) joined to both the lower and upper beams as shown in FIG. 1A of Crean, usually by welding. The elevated bathroom portion (122, FIG. 1A of Crean) of the typical two level chassis is typically a platform structure constructed of elongate wood members, metal members, or the like, and is supported above and by the lower beam (114, FIG. 1A of Crean). A storage space (140, FIG. 1A of Crean) is defined as the area below the elevated bathroom floor, but above the lower beam.

While the typical two level chassis is particular strong, the design also limits the amount of available storage in the storage area and access to that storage area. In particular, since the lower beam defines the lower portion of the storage area, the total volume of the storage area is narrowed by the vertical width of the webbing on that beam. For example, using typical chassis materials having an eight-inch to twelve-inch vertical web, the height of the storage area would be reduced by eight to twelve inches, thereby reducing the total volume of the storage area.

In practice, the height limitations imposed by positioning the chassis beam in this area prevents common oversized travel trailer-related items, such as traditional elongate, cylindrical 40 pound Liquid Petroleum Gas ("LPG") tanks, from being accommodated easily in the storage area. In particular, in order for these types of items to fit within such known storage areas, they must either 1) be stored on their sides, thereby taking up much desirable floor space in the storage area, or 2) in some models be stored upright within a limited outrigger area between the chassis beam and storage area door, thereby blocking access to the majority of the storage area.

Some inventors have attempted to improve access to and the overall amount of storage space available in the storage area of a traditional fifth-wheel trailer. However, such improvements typically compromise chassis integrity and significantly increase chassis construction costs. For example, U.S. Pat. No. 5,746,473 to Crean teaches using a three-level chassis structure, which is also commonly referred to as a three-step chassis. FIG. 2A of Crean shows the general layout of such a three level chassis.

Basically, the bottom level, or step, is a horizontal elongate lower chassis beam (202, FIG. 2A of Crean) that supports the aft living portion of the fifth wheel trailer. The forward bedroom is supported by a horizontal elongate upper chassis beam (210, FIG. 2A of Crean), and the bathroom portion is supported by a horizontal elongate intermediate chassis beam (208, FIG. 2A of Crean). The forward end of the lower chassis beam is joined to the back end of the intermediate chassis beam at an aft vertical section, and the forward end of the intermediate chassis beam is joined to the back end of the upper chassis beam at a forward vertical section. Accordingly, the chassis structure forms three steps from the lower chassis beam to the intermediate chassis beam and then the upper chassis beam.

As a result, the thick lower beam does not block the lower entrance to the storage area, thereby, Crean suggests, the storage area is more easily accessible. Crean also teaches mounting the black and gray water tanks to the intermediate chassis beam, thereby elevating them within the storage area. Accordingly, Crean reports that heavy objects need not be lifted as high to place them in the storage area.

While the three-level chassis in Crean offers these limited benefits, the design essentially doubles the number of parts and welds comprising the load carrying chassis components over a traditional two-level chassis. Accordingly, a three-level chassis is more costly to manufacturer and less durable than a similarly sized two-level chassis structure. Moreover, because the upper edge of the storage area is defined by the intermediate beam, and the thickness of the intermediate beam is essentially as thick as a traditional lower beam on a two-level chassis, the height of the storage area, and accordingly its volume, is still limited by the chassis structure. For example, where the intermediate beam is made of typical chassis materials having an eight-inch vertical web, the height of the storage area would be reduced by eight inches, thereby reducing the total volume of the storage area. Accordingly, as with a traditional two-level chassis, the height limitations imposed by positioning the intermediate chassis beam in this area still prevents common oversized travel trailer-related items, such as 40 pound LPG tanks, from being accommodated easily in the storage area. Moreover, positioning the black and gray storage tanks adjacent to the intermediate beams, as taught by Crean, further reduces the height of the storage area, thereby further compromising the storage area's ability to accommodate common large objects. Because the intermediate chassis beam is a primary load carrying chassis element, any reduction in the thickness of this beam around the storage area of a three-level chassis to increase the height of the storage area would compromise the strength of the chassis.

Accordingly, despite the known improvements to fifth-wheel travel trailer chassis designs, there remains a need for a chassis that has the strength, durability, and economy of a traditional two-level chassis, but also optimizes the height of the storage area beneath the bathroom portion to easily accommodate common large objects used with travel trailers. In addition to other benefits that will become apparent in the following disclosure, the present invention fulfills these needs.

SUMMARY OF THE INVENTION

The present invention is a travel trailer having a two-level chassis supporting at least two discrete floor sections at two or more different heights above the ground. In particular, an aft floor section is positioned at a lower height, a fore floor section is positioned at an upper height, and an intermediate section is positioned either at the upper height or at a height intermediate to the lower and upper heights. The area underneath the intermediate section and above the bottom of the trailer, defines a storage area.

The two-level chassis includes generally horizontal upper and lower chassis beams. The aft floor section is supported by the lower chassis beam, and the fore floor section is supported by the upper beam. The intermediate floor section is supported by the upper beams and in preferred embodiments is positioned below the upper edge of the upper chassis beams such that the height of, and general access to, the storage area is optimized because the chassis beams do not interfere with access to this area.

In a preferred embodiment, the upper beam has a lower flange, and the intermediate floor section is supported by this lower flange. In an alternative preferred embodiment the intermediate floor is suspended fully below the upper beams.

Common fixed trailer accessories, such as gray and black water tanks, their related plumbing, trailer heaters and the like are clustered together within a limited section of the storage area, such as near the rear of the storage area, whereby the majority of the storage area remains unoccupied. Accordingly, storage space within the storage area is optimized, and the full height of the storage area is available throughout the majority of the storage area to accommodate oversized objects.

BRIEF DESCRIPTION OF THE DRAWINGS

FIG. 5 is a fragmentary isometric view of the chassis structure and floor portions mounted thereto of FIG. 3 with some elements removed to show underlying detail.

FIG. 6 is a cross-sectional view taken along lines 6—6 of FIG. 2.

DETAILED DESCRIPTION OF PREFERRED EMBODIMENTS

Figure 1:
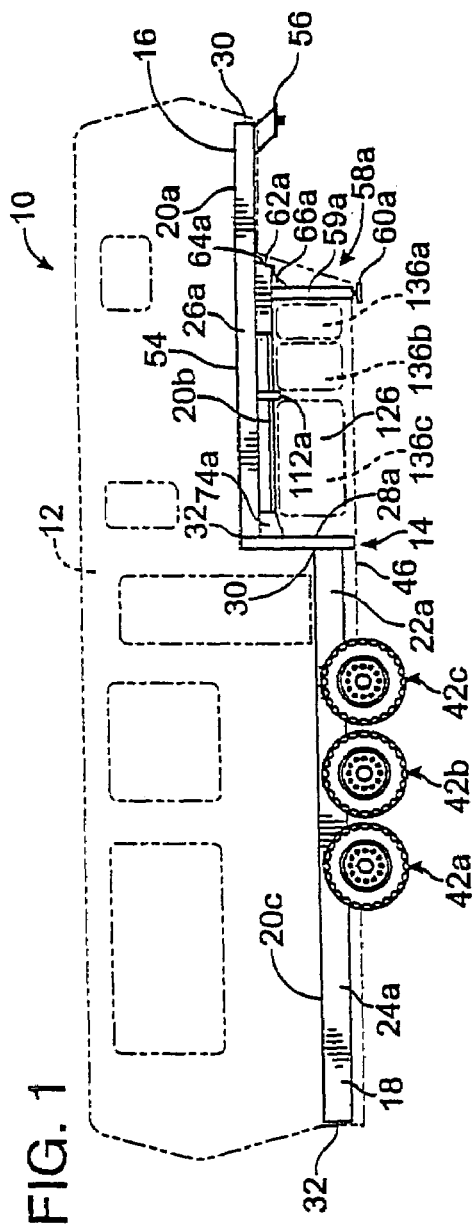
FIG. 1 is a side elevation view of a travel trailer in accordance with a first preferred embodiment of the invention.

Two embodiments of an improved two-level travel trailer chassis having at least one floor section supported by an upper chassis beam and preferably positioned below the upper edge of that beam are disclosed in FIGS. 1–8.

I. First Preferred Embodiment

An improved travel trailer 10 having an enclosed shelter 12 supported by a two-level chassis 14 defining a forward upper portion 16 and a rearward lower portion 18, wherein the chassis 14 supports at least three discrete floors 20a, 20b, 20c by suspending at least one floor 20b below the upper edge 15 of the forward upper portion 16 is disclosed in FIGS. 1–7.

A. Chassis Assembly

Figure 2:
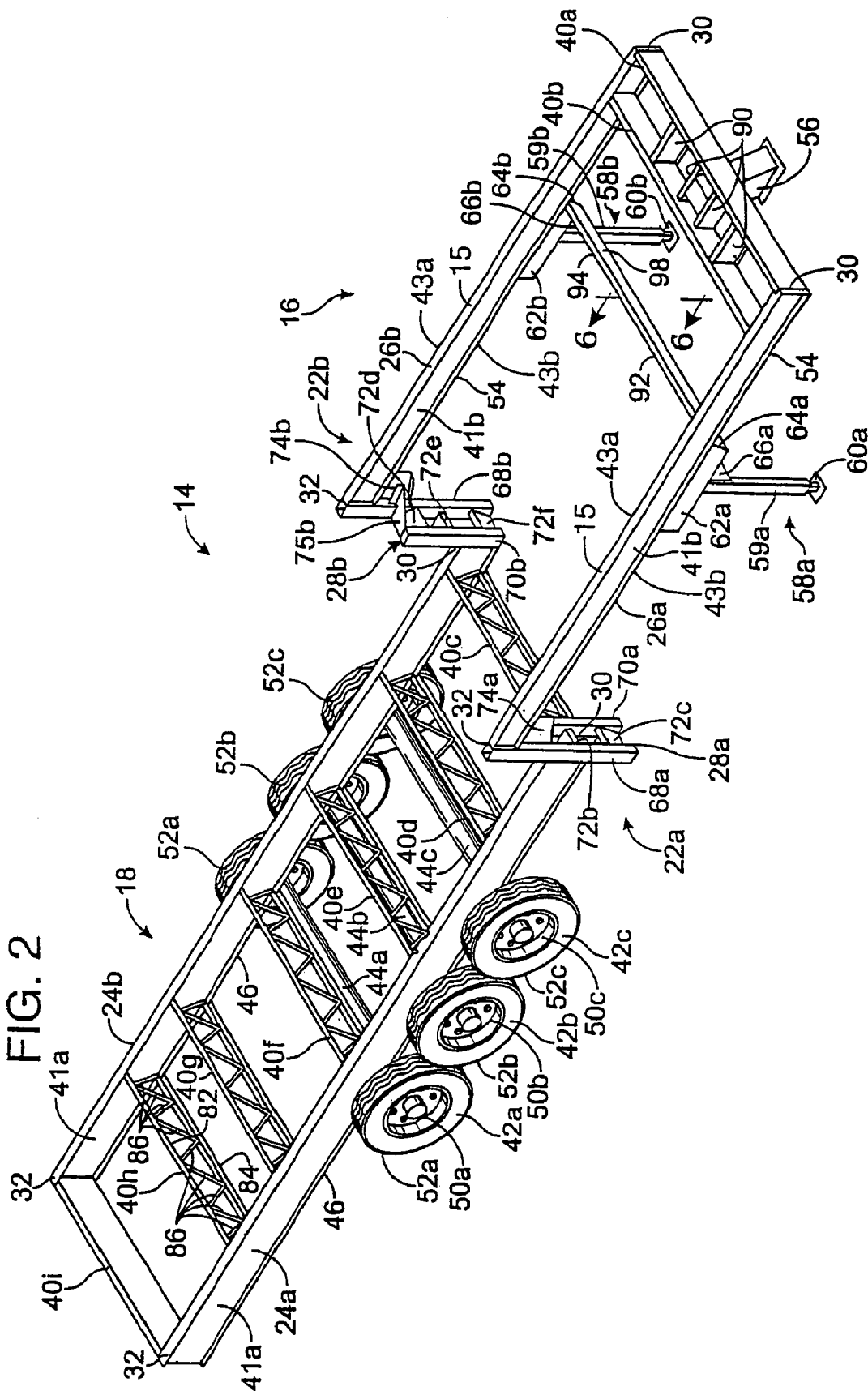
FIG. 2 is an isometric view of the chassis structure of the travel trailer of FIG. 1.

As best shown in FIG. 2, the chassis 14 preferably includes a left and right chassis beam assembly 22a, 22b respectively, with each beam assembly 22a, 22b including an elongate lower chassis beam 24a, 24b and an elongate upper chassis beam 26a, 26b joined together at vertical riser assemblies 28a, 28b. Each upper chassis beam 26a, 26b and lower chassis beam 24a, 24b has a front end 30 and a back end 32, with the front end 30 of the lower chassis beams 24a, 24b secured to the back ends 32 of their respective upper chassis beams 26a, 26b at the vertical riser assemblies 28a, 28b such that the upper chassis beams 26a, 26b and lower chassis beams 24a, 24b are aligned parallel with each other and the upper chassis beams 26a, 26b are horizontally-aligned above the lower chassis beams 24a, 24b as shown.

The left and right beam assemblies 22a, 22b are spaced apart from each other and joined together with a plurality of chassis cross-members 40a–i positioned along the longitudinal length of the chassis 14, such that the lower chassis beams 24a, 24b and cross members 40c–i define the rearward lower portion 18 of the chassis 14 and the upper chassis beams 26a, 26b and cross-members 40a, 40b define the forward upper portion 16 of the chassis.

Preferably, the upper and lower chassis beams 26a, 26b, 24a, 24b are constructed with strong and durable materials, such as steel I-beams. More preferably, the lower chassis beams 24a, 24b have a 12-inch vertical web 41a, and the upper beams have an 8-inch vertical web 41b with an upper and lower flange 43a, 43b, respectively, extending therefrom. The upper flange 43a defines the upper edge 15 of the upper beams 26a, 26b.

The rearward lower portion 18 of the chassis 14 includes at least one perpendicularly aligned wheel assembly 42a, 42b, 42c, preferably including an axle tube 44a, 44b, 44c secured to the lower side 46 of the lower chassis beams 24a, 24b at suspension elements (not shown). An axle hub (not shown) is journaled to each axle tube 44a, 44b, 44c and secured to wheels 50a, 50b, 50c, preferably having tires 52a, 52b, 52c attached to them and aligned substantially parallel to the lower chassis beams 24a, 24b.

Figure 4:
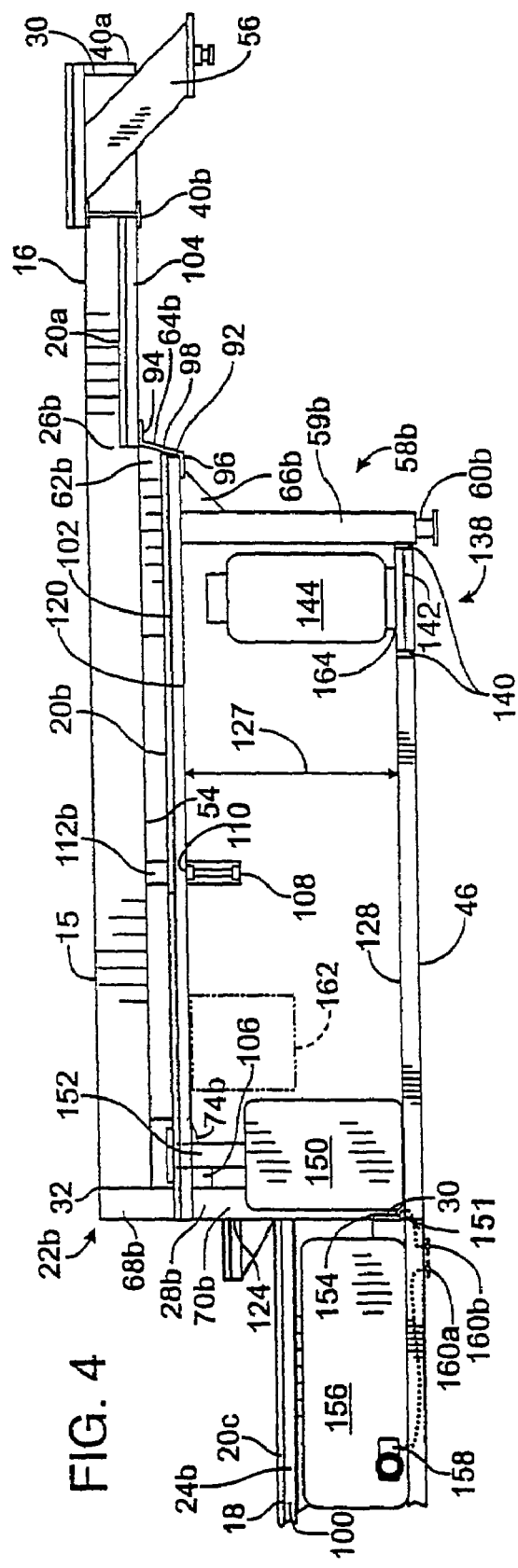
FIG. 4 is a fragmentary side view taken along line 4—4 of FIG. 3.

The underside 54 of the forward upper portion 16 of the chassis includes a mounting portion 56 for detachable securing the chassis 14 to a trailer mount (not shown), or hitch. Preferably, a pair of jack legs 58a, 58b, each having a support tube 59a, 59b and a retractable extension portion 60a, 60b, is secured to the underside 54 of the forward upper portion 16 as shown to support the forward upper portion 16 when the trailer 10 is detached from its towing vehicle (not shown). More preferably, the support tubes 59a, 59b are steel 4-inch by 2-inch tubes having a thickness of 3/16 of an inch and include jack leg reinforcement members 62a, 62b having slightly angled front ends 64a, 64b and gussets 66a, 66b as best shown in FIGS. 2 & 4.

The vertical riser assemblies 28a, 28b each preferably include a generally vertically aligned perimeter chassis post 68a, 68b and an inner chassis post 70a, 70b joined together by transition members 72a–f. As best shown in FIG. 2, the front ends 30 of the lower chassis beams 24a, 24b are secured to the lower ends of the inner chassis posts 70a, 70b, and the back ends 32 of the upper chassis beams 26a, 26b are secured to the upper ends of the perimeter chassis posts 68a, 68b preferably by welding. More preferably, the chassis posts 68a, 68b, 70a, 70b are constructed of elongate steel tube, such as 5-inch by 3-inch tube having a thickness of 3/16 of an inch. Each riser assembly 28a, 28b preferably includes reinforcing gussets 74a, 74b, 75a, 75b (not shown), and the upper and lower transition members 72a, 72c, 72d, 72f are angled as shown with respect to the chassis posts 68a, 68b, 70a, 70b to increase the strength and durability of the joints.

As best shown in FIG. 2, cross-members 40c–h in the rearward lower portion 18 of the chassis 14 each include upper and lower members 82, 84 secured together by extension members 86, which are preferably angled. More preferably, cross-member 40i is positioned at the back ends 32 of the lower chassis beams 24a, 24b and is a Z-beam having a vertical web.

Cross-members 40a, 40b in the forward upper portion 16 of the chassis 14 are preferably elongate steel 8-inch by 2-inch tubes having a 3/16-inch thickness with one cross-member 40a positioned at the front ends 30 of the upper chassis beam 26a, 26b. More preferably, supports 90 extend between cross members 40a, 40b as shown in FIG. 2.

Figure 7:
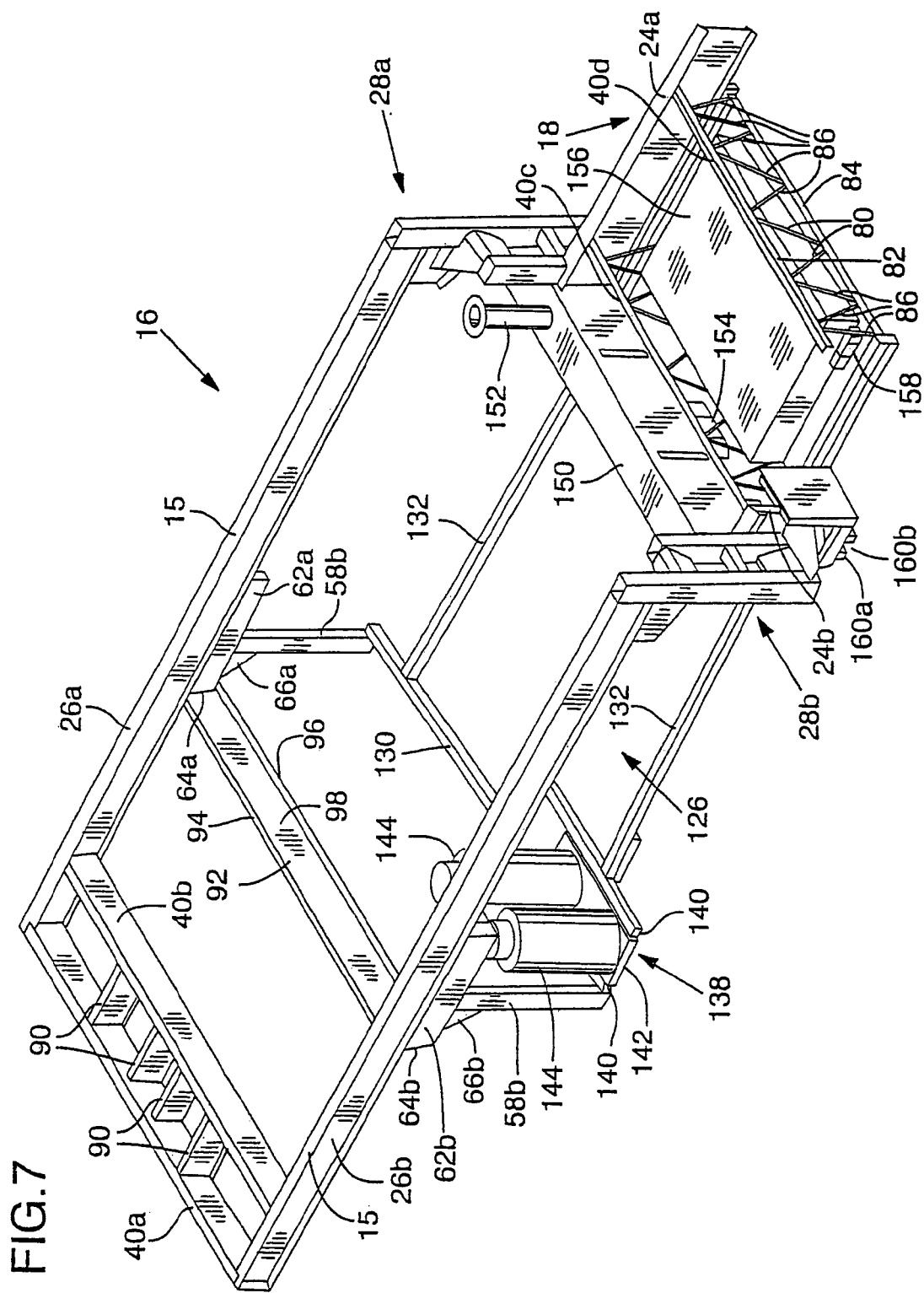
FIG. 7 is a fragmentary isometric view of the chassis structure and floor portions mounted thereto of FIG. 3 with some elements removed to show underlying detail and a possible orientation of common trailer accessories in accordance with a preferred embodiment of the present invention.

An elongate chassis rail lateral tie 92 is secured to and suspended below the upper chassis beams 26a, 26b. Preferably, the lateral tie 92 has a generally Z-shaped cross-section, forming an upper lip 94 and a lower lip 96 separated by an angled web 98, with the upper lip 94 extending toward the front of the chassis 14 and the lower lip 96 extending toward the back of the chassis 14. More preferably, the ends of the lateral tie 92 are secured to the angled ends 64a, 64b of the jack-leg reinforcement members 62a, 62b as best shown in FIGS. 4 & 7.

B. Suspended Floor Assembly And Storage Area Details

Figure 3:
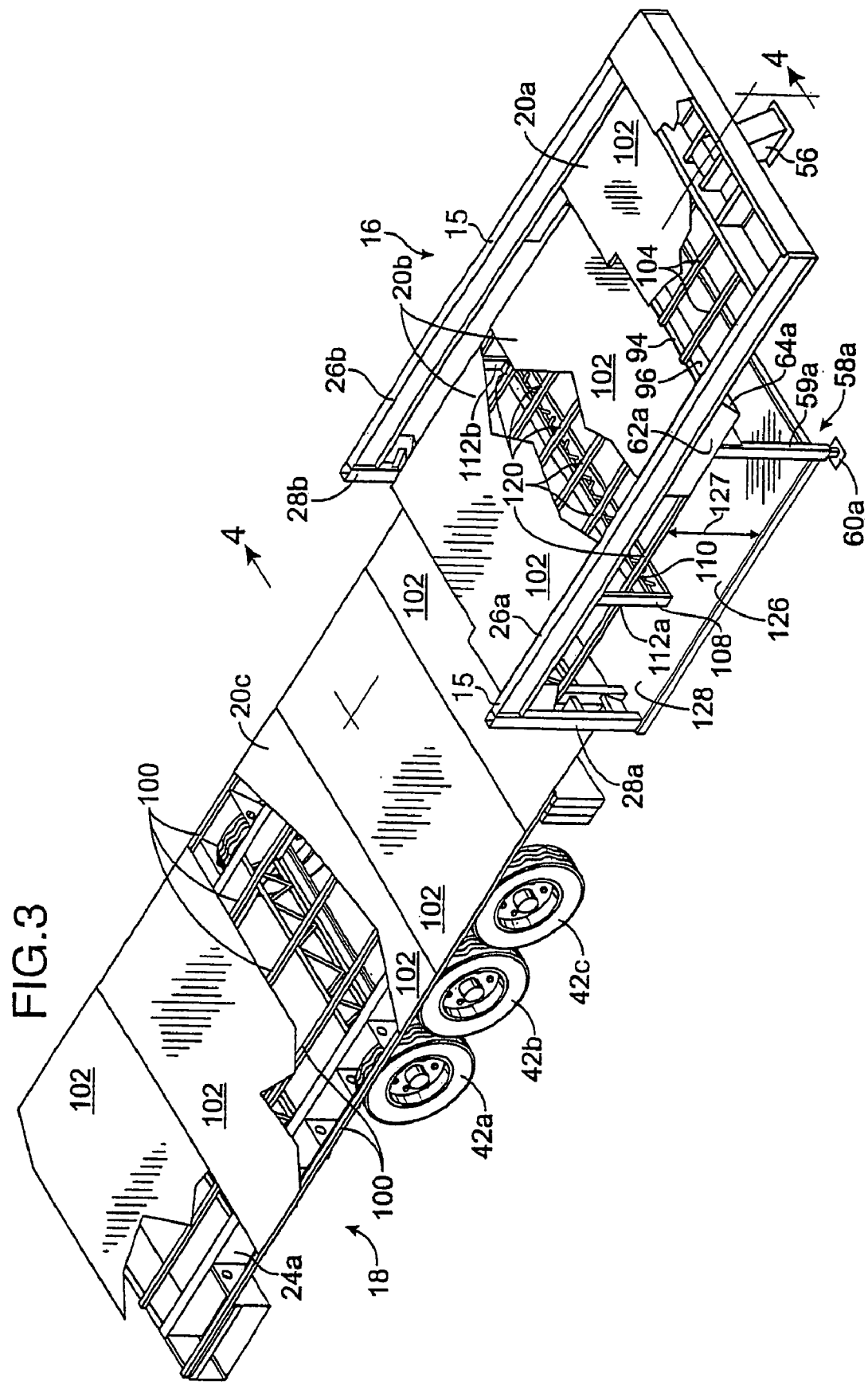
FIG. 3 is an isometric view of the chassis structure of FIG. 2 having floor portions mounted thereto with at least one floor portion suspended from the chassis in accordance with a preferred embodiment of the present invention.

As best shown in FIGS. 3 & 4, a lower floor 20c is supported by the lower portion 18 of the chassis 14, preferably by extending spaced apart elongate lower floor joists 100 from the lower ends of the vertical riser assemblies 28a, 28b to the back ends 32 of the lower chassis beams 24a, 24b and securing planar floor members 102 thereon. Similarly, the upper floor 20a is supported by the upper portion 16 of the chassis 14, preferably by extending spaced apart elongate upper floor joists 104 from an area generally near the front of the chassis 14 to the upper lip 94 of the chassis rail lateral tie 92 and securing planar floor members 102 thereon.

The intermediate floor 20b is positioned below the upper edge 15 of the upper portion 16 of the chassis and suspended below the upper chassis beam 26a, 26b, in an area between the upper floor 20a and lower floor 20c. Preferably, the upper floor 20a defines a bedroom, the lower floor 20c defines a living area, and the intermediate floor 20b defines a bathroom section of the trailer 10.

One known apparatus for suspending the intermediate floor 20b includes extending an elongate generally horizontal aft intermediate floor support 106 between the chassis posts 68a, 68b at a height generally horizontally-aligned with the lower lip 96 of the chassis rail lateral tie 92. In an area that is preferably equal distance between the lateral tie 92 and the aft intermediate floor support 106, a suspended girder 108 having an upper edge 110 is suspended from the upper chassis beams 26a, 26b such that the upper edge 110 is on the same horizontal plane as the lower lip 96 of the lateral tie 92, preferably by extending suspension elements 112a, 112b from the upper chassis beams 26a, 26b and securing the girder 108 to the suspension elements 112a, 112b. Spaced apart intermediate floor joists 120 extend from the lower lip 96 of the lateral tie 92 to the aft intermediate floor support 106. The intermediate floor joists 120 are also supported at the upper edge 110 of the suspended girder 108 as shown. Planar floor members 102 are secured to the intermediate floor joists 120 thereby defining the intermediate floor 20b at a height between the upper and lower floors 20a, 20c, respectively. Preferably, a step 124 is provided between the lower floor 20c and intermediate floor 20b to facilitate access between these floors.

The suspended girder 108 is preferably an elongate cross-rod beam as best shown in FIG. 3. Alternatively, the suspended girder 108 can include a traditional steel tube, such as tubes having a rectangular or square cross-section. Of course alternative suitably strong elongate support structures can be used for this purpose.

The area between the support tubes 59a, 59b and vertical riser assemblies 28a, 28b, above the lower side 46 of the trailer 10, and below the intermediate floor joists 120 defines a storage area 126, or trunk space, of the trailer 10. The intermediate floor 20b is suspended from the upper chassis beams 26a, 26b such that the height 127 of, and general access to, the storage area 126 is optimized because the chassis beams 24a, 24b, 26a, 26b do not interfere with access to this area.

Preferably, the floor 128 of the storage area 126 is supported by a storage area lateral tie 130 extending between the lower end portions of the support tubes 59a, 59b and spaced apart elongate extension members 132 extending from the storage area lateral tie 130 to the lower chassis beam 24a, 24b as best shown in FIG. 5. Spaced apart storage area floor joists 134, extending between the sides of the storage area 126, are secured the elongate extension members 132. Planar floor members 102 are secured to the storage area floor joists 134, defining the floor 128 of the storage area 126. Accordingly, the distance between the floor 128 of the storage area 126 and the lower edge of the intermediate floor joists 120 defines the height of the storage area.

The upper floor joists 104, lower floor joists 100, and intermediate floor joists 120, storage area lateral tie 130, and elongate extension members 132 do not carry as great of a load as that carried by the chassis 14. Accordingly, these components need not be as strong as the chassis components, and accordingly can have smaller cross-sectional dimensions. For example, the upper, lower, and intermediate floor joists 104, 100, 120, respectively, are preferably constructed with 1-inch by 1-inch 11 gage steel tubes, and the storage area lateral tie 130 and elongate extension members 132 are preferably constructed with 2-inch by 2-inch steel tubes having a ¼-inch thickness. Of course these components can be made with any other suitably sized, shaped, and strong materials, including wood, other metals, and synthetic or composite materials.

As best shown in FIG. 1, the enclosed shelter 12 encloses the storage area and includes a plurality of access doors 136. Preferably, the access doors 136a–c open outward and the height of the access doors 136 is substantially equivalent to the height of the storage area 126, thereby not becoming a limiting factor in the size of objects that may be placed in the storage area 126.

More preferably, and as best shown in FIGS. 4 and 7, a planar sliding mechanism 138 having a pair of rail sliders 140 secured to the storage area floor 128, and a platform 142 sized to support a conventional 40 pound LPG removable bottle 144 is slidably secured to the rail sliders 140. An appropriately sized access door 136a is aligned with the sliding mechanism to permit easy access.

C. Plumbing and Related Hardware Details

Optimal storage space is provided by clustering the common fixed trailer accessories, such as gray and black water tanks, their related plumbing, trailer heaters and the like within the same area in or near the storage area. As best shown in FIGS. 4 & 7, an elongate black water tank 150 having a substantially rectangular cross-section preferably rests on the storage area floor 128 in the back of the storage area 126 with a drain 152 extending upward from the black tank 150 through the bathroom intermediate floor 20b. A remotely-actuated valve, such as a cable actuated black water tank dump valve 154 is positioned adjacent to and in fluid communication with the black water tank 150, and associated plumbing 151 is preferably installed to the valve 154 to accommodate easy emptying of the tank 150.

An elongate gray water tank 156 having a substantially rectangular cross section is preferably secured within an area below the lower floor joists 100, above the lower side 46 of the trailer 10, and between the lower chassis beams 24a, 24b and lower cross-members 40c, 40d. A remotely-actuated valve, such as a cable actuated gray water tank dump valve 158 is positioned adjacent to and in fluid communication with the gray water tank 156 and associated plumbing 151 is preferably installed to accommodate easy emptying of the gray water tank 156. Preferably the cable actuation control handles 160a, 160b for the black and gray water dump valves 154, 158 are positioned together, adjacent to the outside of the trailer, and outside of the storage area for easy actuation, even if the storage area 126 is full.

If desired, a traditional trailer furnace (162, FIG. 4) may be secured to the intermediate floor joists 120 near the black water tank 150.

D. Use and Operation

The travel trailer 10 accordingly to the present invention is used like any other fifth-wheel trailer. Appropriate home furnishings and conveniences are placed in the living, bathroom, and bedroom portions of the trailer, which has the strength and durability of any trailer having a conventional two-level chassis.

However, volume of the storage area 126, and access to that area, is optimized. For example, thick chassis beams do not limit the height of the storage area, or require a user to lift items to be stored above any bottom chassis beam. Moreover, by clustering the common fixed trailer accessories within the same area in or near the storage area, the remaining useful area within the storage area is optimized. Accordingly, oversized objects can be easily accommodated in the storage area with minimal lifting. For example, a conventional 40 pound LPG removable bottle 144 typically is an elongate canister of about 29¼ inches having a flat bottom end 164 on which it rests, defining its standing position. The height 127 of the storage area can be high enough to easily accommodate this type of bottle in its standing position. Moreover, in trailers so equipped, the sliding platform 142 and special access door 136a further facilitate loading and storage of these types of bottles.

II. Second Preferred Embodiment

Figure 8:
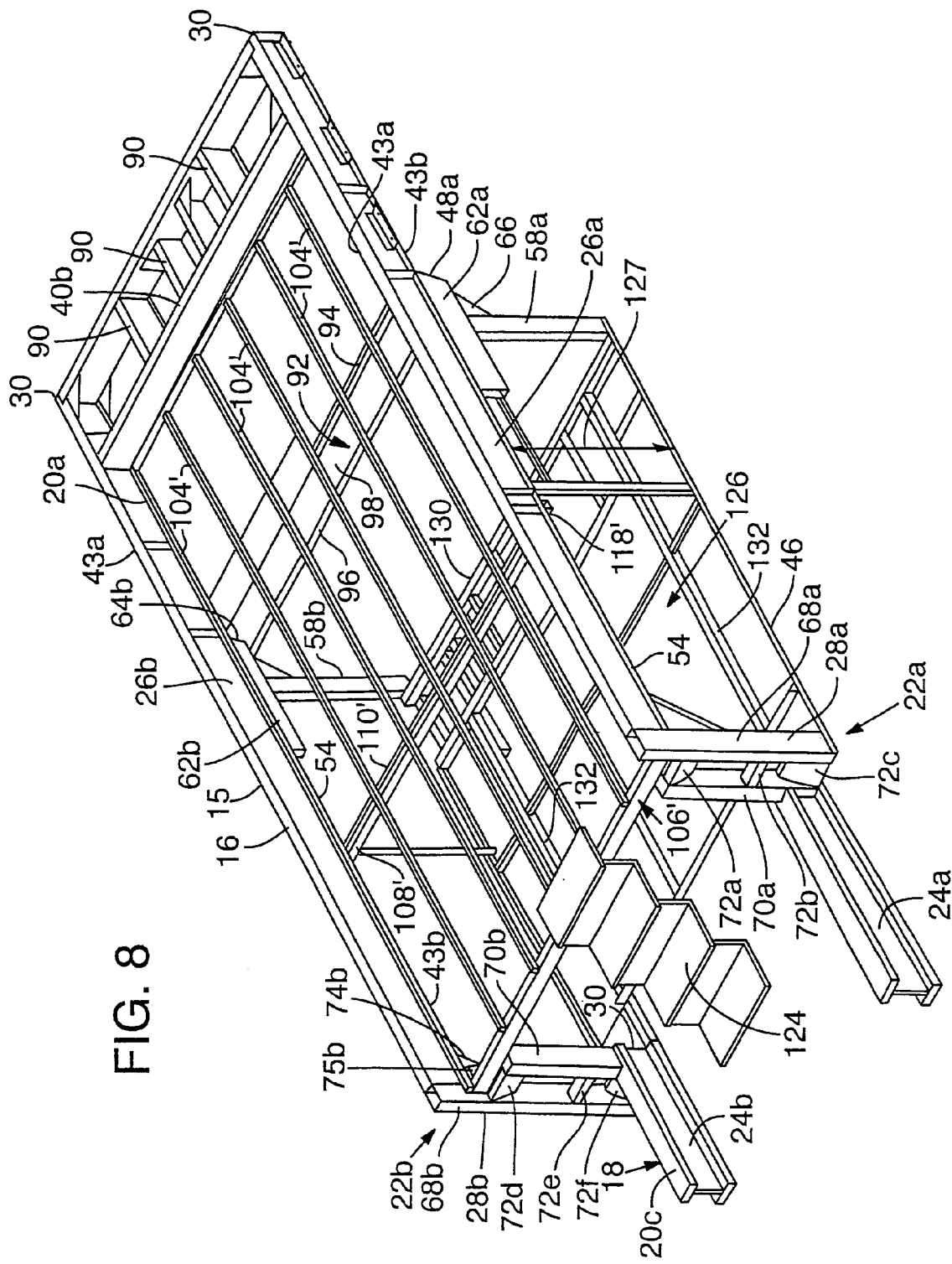
FIG. 8 is a fragmentary isometric view of the chassis structure and floor portions mounted in accordance with an alternative preferred embodiment showing a possible orientation wherein the intermediate floor is supported by the upper chassis beams and positioned below the upper edge of the upper chassis beams.

An alternative preferred embodiment for supporting the intermediate floor 20b is shown in FIG. 8. This embodiment has substantially the same basic elements and construction of the first preferred embodiment. Accordingly, in order to avoid undue repetition, unless specifically identified otherwise below, reference numerals refer to like numbered elements having a like orientation and configuration as those elements identified in the discussion of the first preferred embodiment.

In this embodiment the intermediate floor 20b is positioned below the upper edge 15 of the upper beams 26a, 26b, and preferably supported by the lower flange 43b of the upper beams 26a, 26b, intermediate floor support 106', suspended beam 108', and the upper lip 94 of the chassis rail lateral tie 92.

In particular, and referring specifically to FIG. 8, the intermediate floor 20b includes extending the elongate generally horizontal aft intermediate floor support 106' between the chassis posts 68a, 68b at a height generally horizontally-aligned with the upper lip 94 of the chassis rail lateral tie 92. In an area that is preferably equal distance between the lateral tie 92 and the aft intermediate floor support 106', the suspended beam 108' having an upper edge 110' is suspended from the upper chassis beams 26a, 26b such that the upper edge 110' is substantially on the same horizontal plane as the upper lip 94 of the lateral tie 92, preferably by securing the suspended beam 108' directly to the lower side of the upper chassis beams 26a, 26b.

Spaced apart intermediate floor joists 104' extend from the aft intermediate floor support 106' to the upper lip 94 of the lateral tie 92 to the aft intermediate floor support 106'. The intermediate floor joists 104' are also supported at the upper edge 110' of the suspended beam 108' as shown. Planar floor members (not shown) are secured to the intermediate floor joists 120 thereby defining the intermediate floor 20b at a height below the upper edge 15 of the upper chassis rails 26a, 26b.

More preferably, the intermediate floor joists 104' also extend from the upper lip 94 of lateral tie 94 forward to cross-member 40b, and covered by planar floor member (not shown) thereby defining the upper floor being substantially parallel to the intermediate floor. Stairs 124 extend from the lower floor to the intermediate floor, facilitating access between the floors.

The area between the support tubes 59a, 59b and vertical riser assemblies 28a, 28b, above the lower side 46 of the trailer 10, and below the intermediate floor joists 104' defines a storage area 126, or trunk space, of the trailer 10. As with the first embodiment, the intermediate floor 20b is positioned below the upper edge 15 of the upper chassis beams 26a, 26b such that the height 127 of, and general access to, the storage area 126 is optimized because the chassis beams 24a, 24b, 26a, 26b do not interfere with access to this area.

Since the intermediate floor of the second preferred embodiment is positioned higher than the intermediate floor of the first preferred embodiment, the overall storage area in the storage space of the second preferred embodiment is increased over that provided by the first preferred embodiment. Moreover, positioning the intermediate floor at the same level as the upper floor eliminates steps between these floors, thereby facilitating user movement between them.

As with the first embodiment, the lower floor joists 100, intermediate floor joists 104', suspended beam 108', storage area lateral tie 130, and elongate extension members 132 do not carry as great of a load as that carried by the chassis 14. Accordingly, these components need not be as strong as the chassis components, and accordingly can have smaller cross-sectional dimensions. For example, the lower and intermediate floor joists 100, 104' respectively, are preferably constructed with 1-inch by 1-inch 11 gage steel tubes, and the storage area lateral tie 130 and elongate extension members 132 are preferably constructed with 2-inch by 2-inch steel tubes having a ¼-inch thickness. Of course these components can be made with any other suitably sized, shaped, and strong materials, including wood, other metals, and synthetic or composite materials.

In view of the wide variety of embodiments to which the principles of the invention can be applied, it should be apparent that the detailed description of a preferred embodiment is illustrative only and should not be taken as limiting the scope of the invention. For example, although the preferred chassis beams 24a, 24b, 26a, 26b are I-beams, any suitably strong shape or material could be used without departing from the scope of the invention. Moreover, although preferred sizes and materials for the various beams, tubes, posts and the like have been disclosed, any suitably strong materials, shapes, and dimensions may be used depending on the specific design needs of a particular trailer. Also, although three wheel assemblies 42a, 42b, 42c are shown in the figures, one, two, or even more such assemblies could be used depending on the load to be incurred by the chassis. In addition, to optimize headroom and storage area room for a particular configuration, the height of the intermediate floor can be positioned at any position below the upper edge of the upper chassis beams including at the same height as the upper floor as shown and described in the second preferred embodiment or at any height between the upper and lower floors as shown and described in the first preferred embodiment of the present invention.

Accordingly, the claimed invention includes all such modifications as may come within the scope of the following claims and equivalents thereto.

What is claimed is:

1. A travel trailer for being towed by a vehicle including:
a multi-level chassis having front and back ends and at least one elongate beam having an upper edge;
a wheel assembly secured toward the back end of the chassis;
a mounting portion secured toward the front end of the chassis for detachably securing said chassis to the vehicle;
a shelter secured to the chassis; said shelter having a bedroom area and a bathroom area with a continuous generally horizontal floor therebetween; and
said generally horizontal floor operably secured to the at least one elongate beam and positioned below the upper edge of said at least one elongate beam.

2. The travel trailer of claim 1, wherein said chassis is a two-level chassis having an upper portion and a lower portion, and said front end is at said upper portion and said back end is at said lower portion.

3. The travel trailer of claim 2, wherein said floor is suspended below said upper portion of said chassis.

4. The travel trailer of claim 2, wherein the trailer has a lower edge, and further including an enclosed storage area below the floor and above the lower edge of the trailer.

5. The travel trailer of claim 2, further including a generally horizontal upper floor positioned vertically above said generally horizontal floor, and a generally horizontal lower floor positioned vertically below said generally horizontal floor.

6. The travel trailer of claim 5, wherein said upper floor is secured to said upper portion of said chassis and said lower floor is secured to said lower portion of said chassis.

7. The travel trailer of claim 6, wherein:
said trailer has a lower edge;
said chassis includes an upper chassis beam secured to a lower chassis beam at a vertical riser;

said horizontal floor is supported by said upper chassis beam; and further including an enclosed storage area below the horizontal floor, forward of the vertical riser and above the bottom edge of the trailer.

8. The travel trailer of claim 7, wherein said storage area has a storage area floor and further including:
a first liquid storage tank secured to the storage area floor adjacent to the vertical riser;
plumbing extending from the liquid storage tank to said floor;
a remotely-actuated dump valve having an actuation handle, said valve in fluid communication with said tank; and
said actuation handle secured outside of said storage area to facilitate easy actuation of the valve when the storage area is full.

9. The travel trailer of claim 8, wherein said lower beam has a vertical thickness and further including:
a second liquid storage tank secured below the lower floor, above the lower edge of the trailer, and within the area occupied by the vertical thickness of the lower beam;
a second remotely-actuated dump valve having a second actuation handle, said valve in fluid communication with said second tank; and
said second actuation handle secured outside of said storage area to facility easy actuation of said second valve when the storage area is full.

10. The travel trailer of claim 2, wherein said upper portion of said chassis is an I-beam having a vertical web, upper and lower flanges, and a lower edge, and said floor is supported by said lower flanges.

11. The travel trailer of claim 10, further including a plurality of said I-beams aligned substantially parallel and spaced apart from each other, and further including a beam secured to the lower edges of said I-beams and extending between said I-beams for supporting said floor.

\* \* \* \* \*